United States Patent
Mitsugi

(10) Patent No.: US 10,417,998 B2
(45) Date of Patent: *Sep. 17, 2019

(54) APPLICATION EXECUTION APPARATUS AND APPLICATION EXECUTION METHOD

(71) Applicant: MITSUBISHI ELECTRIC CORPORATION, Tokyo (JP)

(72) Inventor: Tatsuya Mitsugi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/575,759

(22) PCT Filed: Aug. 31, 2015

(86) PCT No.: PCT/JP2015/074575
§ 371 (c)(1),
(2) Date: Nov. 20, 2017

(87) PCT Pub. No.: WO2017/037819
PCT Pub. Date: Mar. 9, 2017

(65) Prior Publication Data
US 2018/0114507 A1     Apr. 26, 2018

(51) Int. Cl.
*G09G 5/14* (2006.01)
*G06F 9/445* (2018.01)
(Continued)

(52) U.S. Cl.
CPC ............ *G09G 5/14* (2013.01); *G06F 3/14* (2013.01); *G06F 9/445* (2013.01); *G06F 9/4406* (2013.01);
(Continued)

(58) Field of Classification Search
CPC ............ G09G 5/14; G09G 2320/0247; G09G 2360/12; G09G 2360/18; G09G 2380/10;
(Continued)

(56) References Cited

U.S. PATENT DOCUMENTS

| | | | |
|---|---|---|---|
| 7,900,035 B2 | 3/2011 | Yoshida et al. | |
| 9,703,950 B2* | 7/2017 | Vandergeest | G06F 21/55 |

(Continued)

FOREIGN PATENT DOCUMENTS

| | | |
|---|---|---|
| JP | 4498771 B2 | 7/2010 |
| JP | 4978558 B2 | 7/2012 |
| JP | 5028904 B2 | 9/2012 |

OTHER PUBLICATIONS

Office Action dated Dec. 20, 2018 in corresponding German Application No. 112015006856.2.

*Primary Examiner* — Chong Wu
(74) *Attorney, Agent, or Firm* — Birch, Stewart, Kolasch & Birch, LLP

(57) ABSTRACT

An object of the present invention is to provide an application execution apparatus and an application execution method which enable quick startup at cold boot, and which can prevent occurrence of flicker in a display image at the time of camera image handover. The application execution apparatus according to the present invention includes a kernel that includes a display mechanism, a frame control mechanism that controls a plurality of window frames included in the display mechanism, a framework that includes an abstracted display mechanism, a first application that operates by directly using the display mechanism, and a second application that operates by indirectly using the display mechanism, and that includes a function of the first application, where the frame control mechanism performs control such that the same window frame is assigned at a time of operation of each of the first application and the second application.

10 Claims, 15 Drawing Sheets

(51) Int. Cl.
*G06F 9/451* (2018.01)
*G06F 9/4401* (2018.01)
*G06F 3/14* (2006.01)
*H04N 7/18* (2006.01)

(52) U.S. Cl.
CPC ..... *G06F 9/451* (2018.02); *G09G 2320/0247* (2013.01); *G09G 2330/026* (2013.01); *G09G 2340/12* (2013.01); *G09G 2360/12* (2013.01); *G09G 2360/18* (2013.01); *G09G 2380/10* (2013.01); *H04N 7/183* (2013.01)

(58) Field of Classification Search
CPC . G09G 2330/026; G06F 9/4443; G06F 9/445; G06F 9/451; H04N 7/183
See application file for complete search history.

(56) References Cited

U.S. PATENT DOCUMENTS

2009/0282477 A1* 11/2009 Chen ................ G06F 21/51
726/22
2014/0168428 A1   6/2014 Nefedov et al.
2016/0188279 A1*  6/2016 Rajamani ............ G06F 3/1454
345/2.3

* cited by examiner

F I G. 1 3
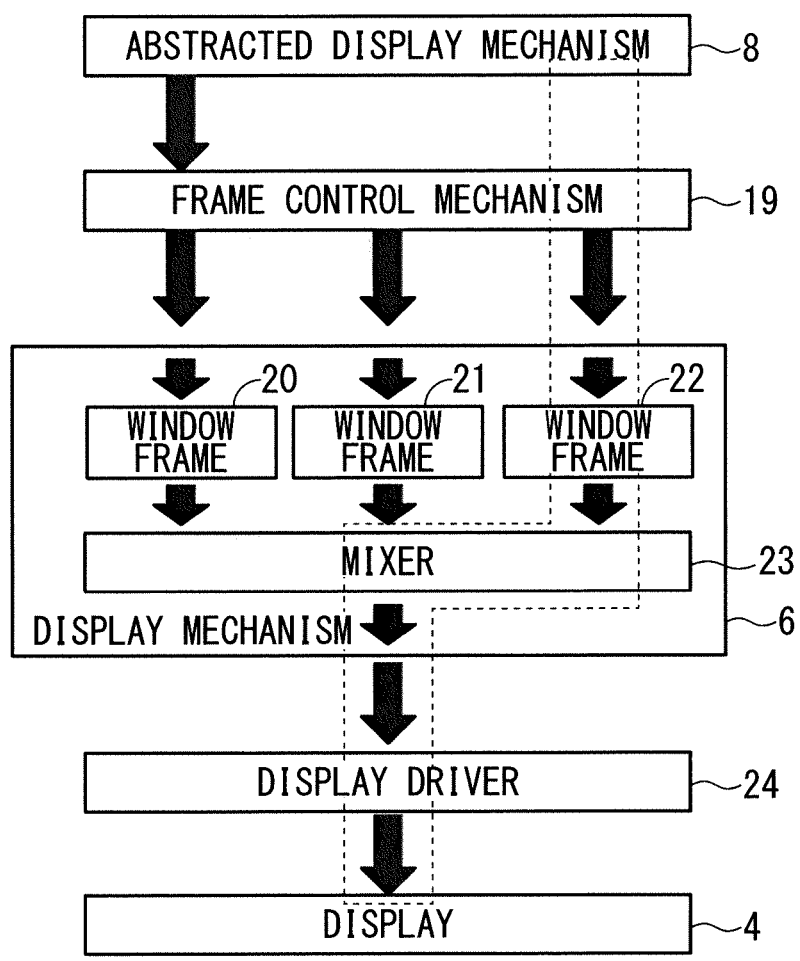

ical field

APPLICATION EXECUTION APPARATUS AND APPLICATION EXECUTION METHOD

TECHNICAL FIELD

The present invention relates to an application execution apparatus and an application execution method for executing an application.

BACKGROUND ART

There is a technique of mounting, on a vehicle, a camera for capturing the back side, and of displaying a video (hereinafter referred to as a camera image) captured by the camera on a display at the time of backward start. The technique requires the camera image to be quickly displayed on the display at the time of backward start.

For example, a camera image processed by hardware other than a Central Processing Unit (CPU) having a sophisticated Operating System (OS) is output to a display, or a camera image is output to the display by a boot loader function of the CPU having the sophisticated OS, and then, a camera image is output to the display after superimposition of a guide line by the hardware other than the CPU or a camera application of the sophisticated OS. In this manner, video handover of displaying a camera image first, and then, displaying a camera image on which a guide line is superimposed is performed. Here, a sophisticated OS is an OS that performs high-level information processing, and a Linux (registered trademark, the same applies hereinafter) OS, an Android (registered trademark, the same applies hereinafter) OS and the like may be cited, for example.

Conventionally, there is disclosed an on-vehicle rear monitoring device including a camera installed at a rear portion of a vehicle, an image processing circuit for processing a video signal and for outputting the signal to image display means, and determination means for determining whether processing (process of superimposing a guide line on an image) can be performed by the image processing circuit in coordination with an input operation of reverse gear, where a process of superimposing a guide line on a camera image is not performed in a case where a guide line is not necessary, and a process of superimposing a guide line on a camera image is performed in a case where a guide line is necessary (for example, see Patent Document 1).

There is also disclosed a display device for a vehicle, the display device including startup determination means for determining whether startup of a main CPU is completed or not, and display control means for causing, in a case where the startup determination means determines that startup of the main CPU is not completed, an image obtained by an image pickup device by a display CPU, without using the main CPU, to be displayed on an on-vehicle display appliance (for example, see Patent Document 2).

Furthermore, there is disclosed an electronic appliance including a first instruction unit for issuing an instruction for normal startup of the electronic appliance, a second instruction unit for issuing an instruction for temporary startup of the electronic appliance, a first arithmetic processing unit, and a second arithmetic processing unit, where, in a case where an instruction is issued by the first instruction unit, the first arithmetic processing unit executes a first operating system, and executes processing of a first user interface when startup of the first operating system is completed, and in a case where an instruction is issued by the second instruction unit, the first arithmetic processing unit does not execute the first operating system or the first user interface, and where the second arithmetic processing unit executes a second operating system that is started in a shorter time than the first operating system, and in a case where an instruction is issued by the first instruction unit, the second arithmetic processing unit executes processing of a second user interface when startup of the second operating system is completed, and suppresses execution of processing of the second user interface when startup of the first operating system is completed (for example, see Patent Document 3).

PRIOR ART DOCUMENTS

Patent Documents

Patent Document 1: Japanese Patent No. 4498771 (B2)
Patent Document 2: Japanese Patent No. 4978558 (B2)
Patent Document 3: Japanese Patent No. 5028904 (B2)

SUMMARY OF INVENTION

Problems to be Solved by the Invention

As described above, when displaying a camera image on a display at the time of a vehicle starting backwards, the camera image is required to be quickly displayed on the display (for example, within two seconds of turning on of power). That is, to start an application for displaying a camera image (hereinafter referred to as a camera application) as fast as possible becomes an important issue. Particularly, startup at cold boot takes time, and startup at cold boot has to be made fast.

In Patent Document 1, whether processing by a graphic LSI is possible when the reverse gear is ON is determined, and if processing by the graphic LSI is determined to be not possible, switching is performed by switching means to achieve a state where a video signal of a camera is directly input to an LCD panel without using the graphic LSI. Accordingly, hardware for superimposing a guide line on a camera image is necessary, resulting in an increase in the cost. Also, because the passing route of a camera image is switched by the switching means, flicker is caused in a display image at the time of camera image handover.

In Patent Document 2, because switching is performed between the main CPU and the display CPU, passing routes of camera images are different. Accordingly, flicker is caused in a display image at the time of camera image handover. Also, hardware for superimposing a guide line on a camera image is necessary, resulting in an increase in the cost.

In Patent Document 3, switching is performed between the first operating system and the second operating system, and thus, flicker is caused in a display image at the time of switching (at the time of camera image handover).

In the case of outputting a camera image to a display by a boot loader function of a CPU having a sophisticated OS, flicker is caused in a display image at the time of camera image handover.

As described above, conventionally, there is a problem that flicker is caused in a display image at the time of camera image handover. Therefore, startup is desirably performed at a high speed at cold boot, and occurrence of flicker in a display image at the time of camera image handover is desirably prevented.

The present invention has been made to solve the problems as described above, and has its object to provide an application execution apparatus and an application execution method which enable quick startup at cold boot, and which can prevent occurrence of flicker in a display image at the time of camera image handover.

Means for Solving the Problems

To solve the problems described above, an application execution apparatus according to the present invention includes a kernel that includes a display mechanism, a frame control mechanism that controls a plurality of window frames included in the display mechanism, a framework that is started by the kernel, and that includes an abstracted display mechanism obtained by abstracting the display mechanism, a first application that operates by directly using the display mechanism, and a second application that operates by indirectly using the display mechanism through the abstracted display mechanism, and that includes a function of the first application, where the frame control mechanism performs control such that a same window frame is assigned at a time of operation of each of the first application and the second application.

Also, an application execution method according to the present invention is an application execution method for sequentially starting at least a kernel and a framework and for executing a first application and a second application, where the kernel includes a display mechanism, where a frame control mechanism controls a plurality of window frames included in the display mechanism, where the framework is started by the kernel, and includes an abstracted display mechanism obtained by abstracting the display mechanism, where the first application operates by directly using the display mechanism, where the second application operates by indirectly using the display mechanism through the abstracted display mechanism, and includes a function of the first application, and where the frame control mechanism performs control such that a same window frame is assigned at a time of operation of each of the first application and the second application.

Effects of the Invention

According to the present invention, the application execution apparatus includes a kernel that includes a display mechanism, a frame control mechanism that controls a plurality of window frames included in the display mechanism, a framework that is started by the kernel, and that includes an abstracted display mechanism obtained by abstracting the display mechanism, a first application that operates by directly using the display mechanism, and a second application that operates by indirectly using the display mechanism through the abstracted display mechanism, and that includes a function of the first application, where the frame control mechanism performs control such that a same window frame is assigned at a time of operation of each of the first application and the second application, and thus, quick startup can be performed at cold boot, and also, occurrence of flicker in a display image can be prevented at the time of camera image handover.

Also, the application execution method is an application execution method for sequentially starting at least a kernel and a framework and for executing a first application and a second application, where the kernel includes a display mechanism, where a frame control mechanism controls a plurality of window frames included in the display mechanism, where the framework is started by the kernel, and includes an abstracted display mechanism obtained by abstracting the display mechanism, where the first application operates by directly using the display mechanism, where the second application operates by indirectly using the display mechanism through the abstracted display mechanism, and includes a function of the first application, and where the frame control mechanism performs control such that a same window frame is assigned at a time of operation of each of the first application and the second application, and thus, quick startup can be performed at cold boot, and also, occurrence of flicker in a display image can be prevented at the time of camera image handover.

The objects, features, aspects and advantages of the present invention will be made more apparent by the following detailed description and the appended drawings.

BRIEF DESCRIPTION OF DRAWINGS

FIG. 13 is a diagram showing an example of the operation of the application execution apparatus according to the first embodiment of the present invention.

DESCRIPTION OF EMBODIMENTS

Embodiments of the present invention will be described below with reference to the drawings.

First Embodiment

First, a configuration of an application execution apparatus according to a first embodiment of the present invention will be described.

Figure 1:
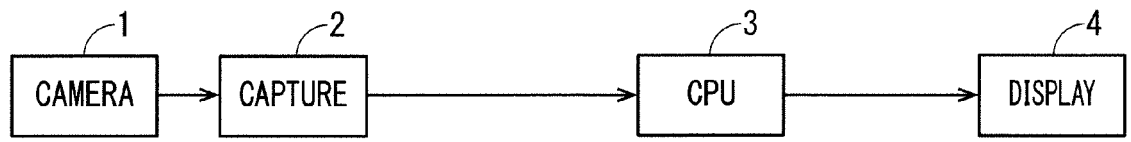
FIG. 1 is a block diagram showing an example of a hardware configuration of an application execution apparatus according to a first embodiment of the present invention.

FIG. 1 is a block diagram showing an example of a hardware configuration of the application execution apparatus according to the first embodiment. Additionally, FIG. 1 shows an example of a hardware configuration of an application execution apparatus which executes an application for causing a camera image captured by a camera 1 to be displayed on a display 4.

As shown in FIG. 1, a camera image captured by the camera 1 is converted by a capture 2 into a format suitable for a CPU 3. The camera image converted by the capture 2 is output to the display 4 after addition of drawing information such as a guide line by the CPU 3. The CPU 3 switches between a camera image and a camera image to which drawing information such as a guide line is added. The application execution apparatus according to the first embodiment is realized by operation of the CPU 3.

The hardware configuration shown in FIG. 1 is the same as a hardware configuration for outputting a normal camera image to a display (hardware configuration not requiring quick startup), and does not include separate hardware for performing quick startup. In the first embodiment, quick startup is realized by the hardware configuration shown in FIG. 1.

Figure 21:
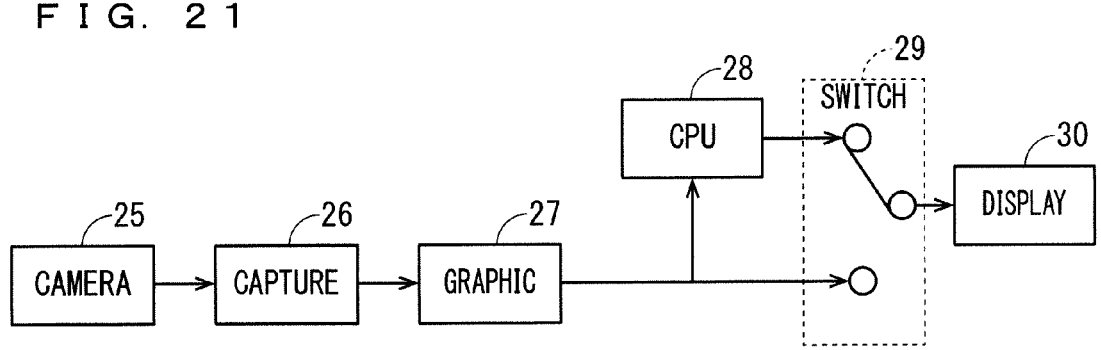
FIG. 21 is a block diagram showing an example of a hardware configuration according to a conventional technique.

FIG. 21 is a block diagram showing an example of a hardware configuration according to a conventional technique. Additionally, FIG. 21 schematically shows a hardware configuration according to Patent Documents 1 and 2.

As shown in FIG. 21, before a CPU 28 is started, a camera image captured by a camera 25 is output to a display 30 through a path of a capture 26, a graphic 27, a switch 29 and the display 30. At this time, a camera image captured by the camera 25 is displayed on the display 30.

Furthermore, when the CPU 28 is started, a camera image captured by the camera 25 is output to the display 30 through a path of the capture 26, the graphic 27, the CPU 28 and the switch 29. At this time, a camera image subjected to a guide line superimposition process by the CPU 28 is displayed on the display 30.

As described above, according to the conventional technique shown in FIG. 21, the passing path of a camera image is switched by the switch 29, and thus, flicker is caused at the time of camera image handover.

Figure 2:
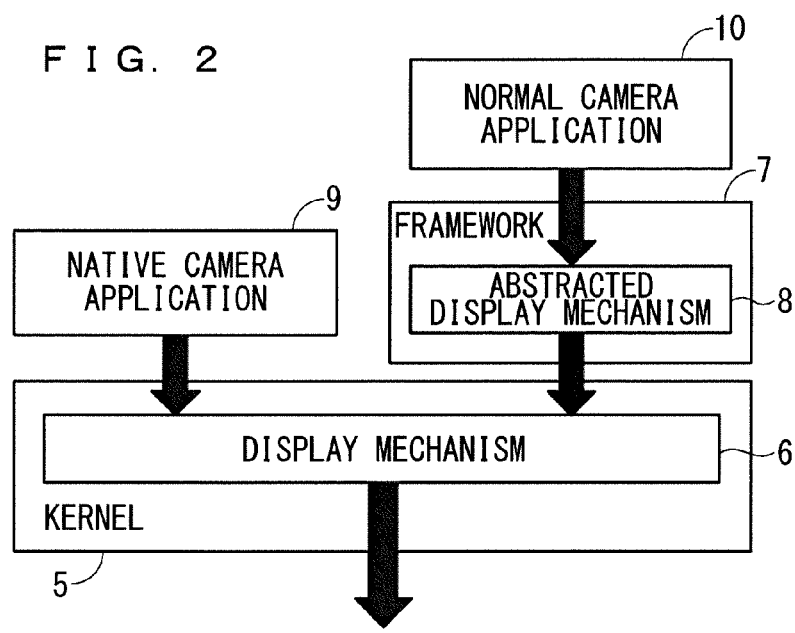
FIG. 2 is a block diagram showing an example of a software configuration of the application execution apparatus according to the first embodiment of the present invention.

FIG. 2 is a block diagram showing an example of a software configuration of the application execution apparatus according to the first embodiment. Additionally, FIG. 2 shows a software configuration performed by the CPU 3 in FIG. 1.

As shown in FIG. 2, the CPU 3 has functions of executing a kernel 5, a framework 7, a native camera application 9, and a normal camera application 10.

The kernel 5 includes a display mechanism 6, which is a function for performing display on the display 4. Also, the kernel 5 includes a driver for performing display on the display 4 (in the example in FIG. 2, a display driver and a capture driver), and a hardware resource (in the example in FIG. 2, a device which is provided to the CPU 3 and which is connected to the display 4). The display mechanism 6 is at an upper level of the driver. Additionally, the first embodiment describes the kernel 5 to be a Linux kernel, but this is not restrictive. Also, the display mechanism 6 may be SurfaceFlinger and Hardware Composer of AndroidOS.

The framework 7 includes an abstracted display mechanism 8 obtained by abstracting the display mechanism 6, the driver, and the hardware resource provided to the kernel.

The native camera application 9 is an application for displaying a camera image on the display 4, and operates by directly using the display mechanism 6. Moreover, the native camera application 9 includes only a basic function of outputting or not outputting a camera image, and does not include a function for superimposing a guide line on a camera image. That is, the native camera application 9 includes a specific function among functions of the normal camera application 10 described later.

The normal camera application 10 is an application for displaying a camera image on the display 4, and operates by indirectly using the display mechanism 6 through the abstracted display mechanism 8. Moreover, the normal camera application 10 includes a complex function such a function for superimposing a guide line on a camera image.

Figure 3:
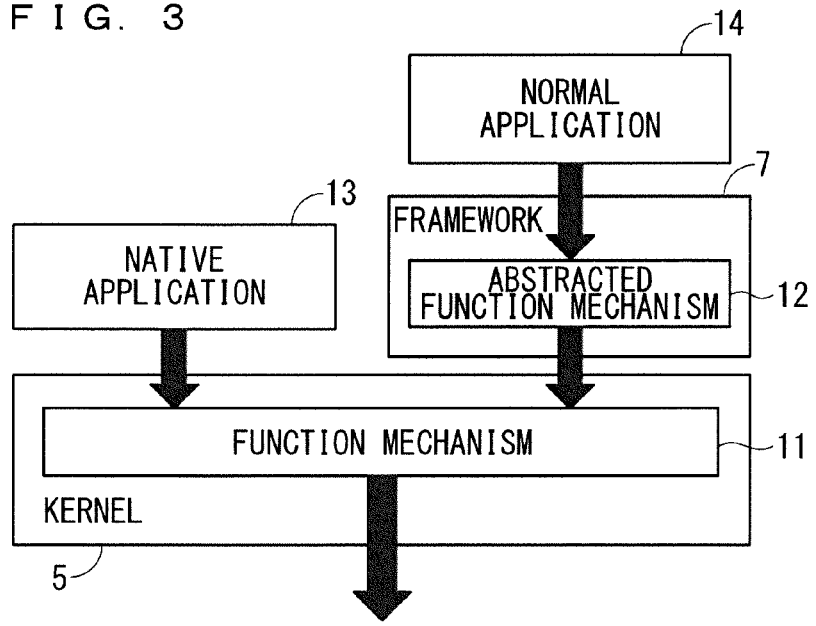
FIG. 3 is a block diagram showing an example of the software configuration of the application execution apparatus according to the first embodiment of the present invention.

FIG. 3 is a block diagram showing an example of the software configuration of the application execution apparatus according to the first embodiment. Additionally, the software configuration shown in FIG. 3 is the software configuration shown in FIG. 2 after generalization.

As shown in FIG. 3, the kernel 5 includes a function mechanism 11 including the display mechanism 6 in FIG. 2. Also, the kernel 5 includes drivers and hardware resources in a peripheral group, including the driver and the hardware resource described with reference to FIG. 2.

The framework 7 includes an abstracted function mechanism 12 obtained by abstracting the function mechanism 11, the driver, and the hardware resource.

A native application 13 (first application) operates by directly using the function mechanism 11. Also, a normal application 14 (second application) has the function of the native application 13, and operates by indirectly using the function mechanism 11 through the abstracted function mechanism 12. The native application 13 includes a specific function among functions of the normal application 14.

Figure 22:
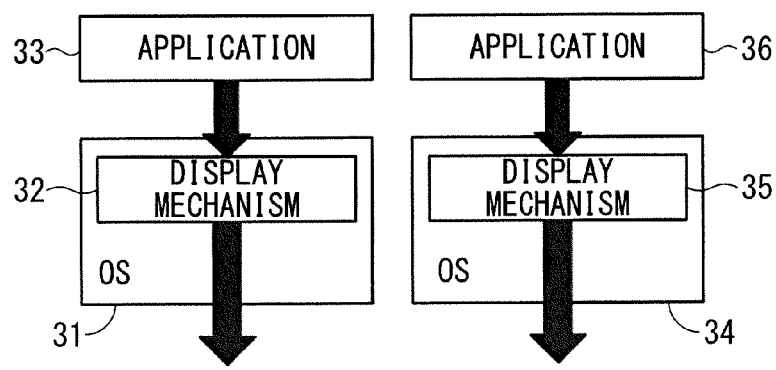
FIG. 22 is a block diagram showing an example of a software configuration according to a conventional technique.

FIG. 22 is a block diagram showing an example of a software configuration according to a conventional technique. Additionally, FIG. 22 schematically shows a software configuration according to Patent Documents 3.

As shown in FIG. 22, an OS 31 includes a display mechanism 32, and an application 33 operates by using the display mechanism 32. Also, an OS 34 includes a display mechanism 35, and an application 36 operates by using the display mechanism 35. Additionally, the applications 33, 36 are applications for causing a video to be displayed on a display.

According to the conventional technique shown in FIG. 22, because the OS 31, 34 is different for each application 33, 36, the OS 31, 34 has to be switched at the time of switching the application 33, 36. At this time, because the display mechanism 32, 35 is different for each application 33, 36, flicker is caused in the video at the time of switching of the application 33, 36.

Figure 4:
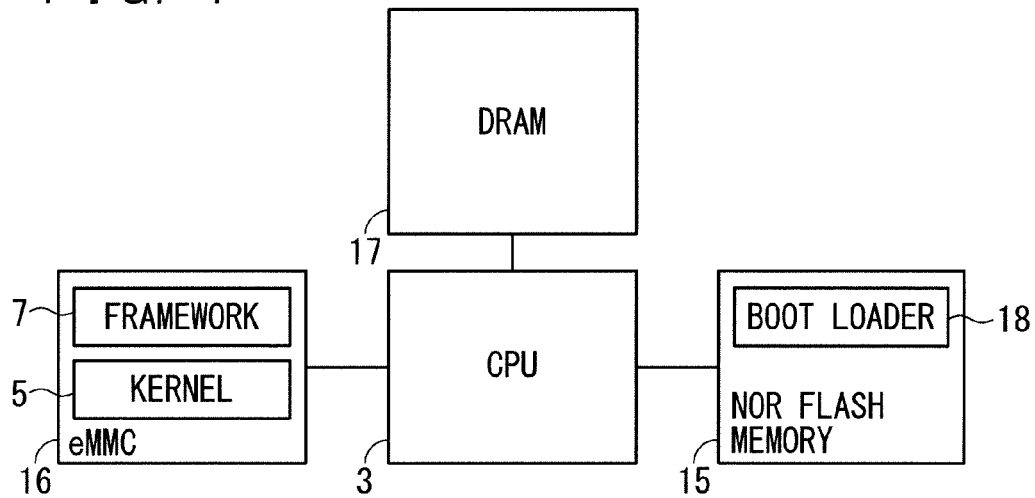
FIG. 4 is a block diagram showing an example of the hardware configuration of the application execution apparatus according to the first embodiment of the present invention.

FIG. 4 is block diagram showing an example of the hardware configuration of the application execution apparatus according to the first embodiment. Additionally, FIG. 4 shows a hardware configuration of the CPU 3 in FIG. 1 and its periphery.

As shown in FIG. 4, a NOR flash memory 15, an embedded Multi Media Card (eMMC) 16, and a Dynamic Random Access Memory (DRAM) 17 are connected to the CPU 3. Additionally, the NOR flash memory 15, the eMMC 16, and the DRAM 17 are omitted in FIG. 1.

The NOR flash memory 15 stores a boot loader 18. Additionally, it is sufficient if the NOR flash memory 15 is a small capacity storage, and the NOR flash memory 15 may be a Read Only Memory (ROM) or the like, for example.

The eMMC 16 stores the kernel 5, the framework 7, and applications (not shown) including the native camera application 9 and the normal camera application 10. Additionally, it is sufficient if the eMMC 16 is a large capacity storage, and the eMMC 16 may be a hard disk or the like, for example.

The CPU 3 loads at least one of the kernel 5, the framework 7, and the boot loader 18 into the DRAM 17 to be operated. Additionally, the native camera application 9 and the normal camera application 10 in FIG. 2, and the native application 13 and the normal application 14 in FIG. 3 are stored in the eMMC 16.

Next, overall operation of the application execution apparatus will be described with reference to FIGS. 5 to 8.

Figure 5:
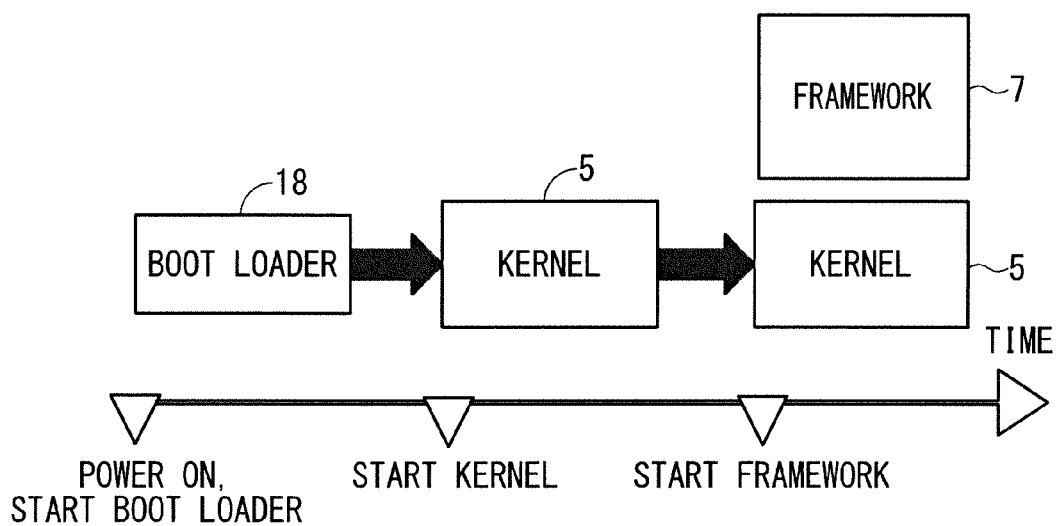
FIG. 5 is a diagram showing an example of an order of startup of the application execution apparatus according to the first embodiment of the present invention.

As shown in FIG. 5, the application execution apparatus operates by sequentially starting the boot loader 18, the kernel 5, and the framework 7. In the following, details of start of the boot loader 18, the kernel 5, and the framework 7 will be given.

Figure 6:
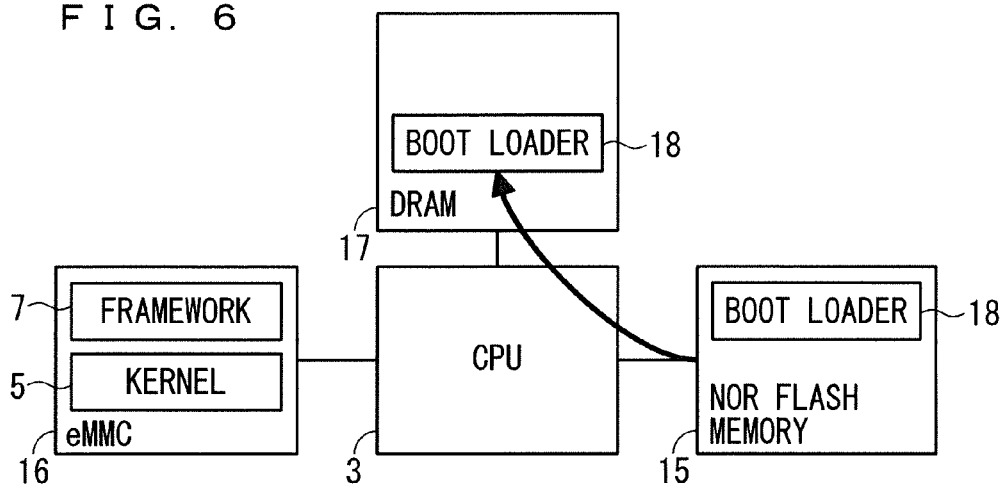
FIG. 6 is a diagram showing an example of operation of the application execution apparatus according to the first embodiment of the present invention.

As shown in FIG. 6, the CPU 3 loads the boot loader 18 stored in the NOR flash memory 15 into the DRAM 17 by using a program stored in the NOR flash memory 15. The loaded boot loader 18 operates by starting at the DRAM 17. Here, the program stored in the NOR flash memory 15 has a function for loading the boot loader 18 into the DRAM 17.

Figure 7:
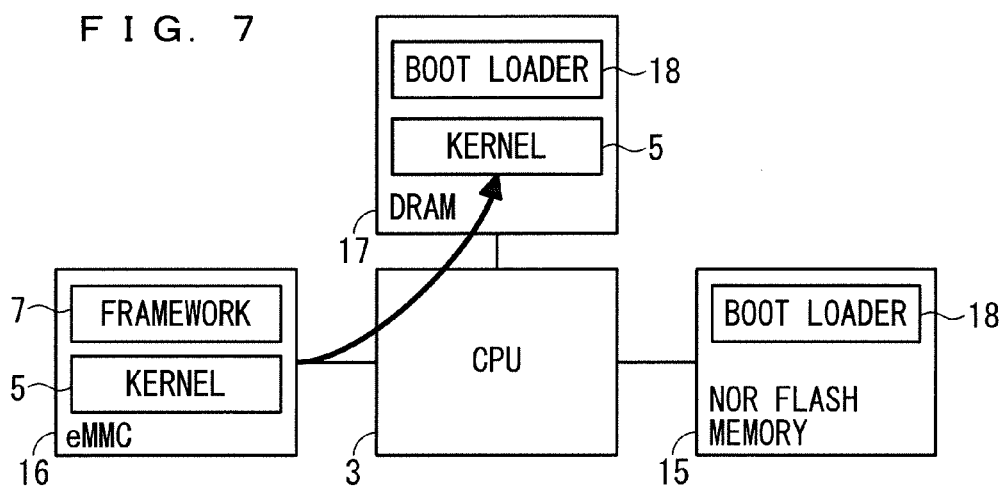
FIG. 7 is a diagram showing an example of the operation of the application execution apparatus according to the first embodiment of the present invention.

As shown in FIG. 7, the boot loader 18 loads the kernel 5 stored in the eMMC 16 into the DRAM 17. The loaded kernel 5 operates by starting at the DRAM 17. More specifically, the kernel 5 initializes and develops the driver, the hardware resource, and the function mechanism.

Figure 8:
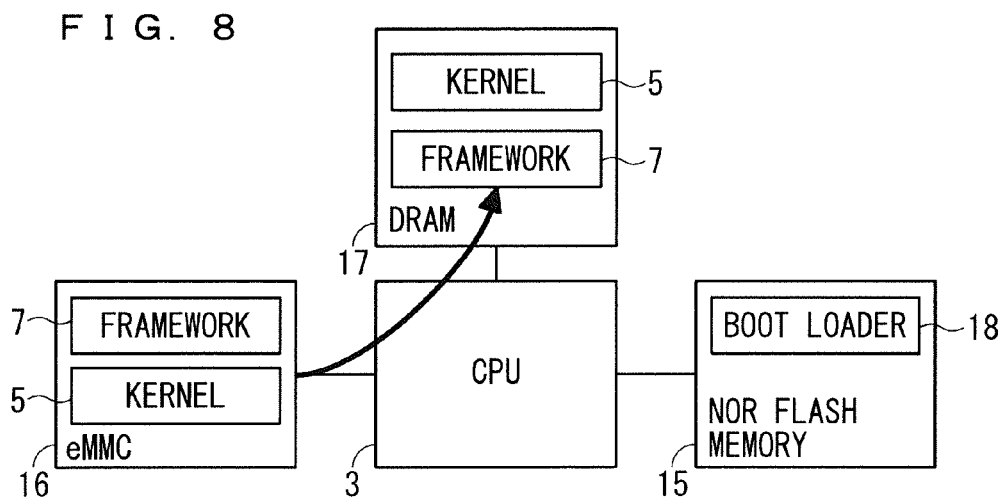
FIG. 8 is a diagram showing an example of the operation of the application execution apparatus according to the first embodiment of the present invention.

As shown in FIG. 8, the kernel 5 loads the framework 7 stored in the eMMC 16 into the DRAM 17. The loaded framework 7 operates by starting at the DRAM 17. More specifically, the framework 7 initializes and develops the abstracted function mechanism and other software components (other abstracted function mechanisms).

In the above description, the sophisticated OS is configured by the framework 7. The kernel 5 and the framework 7 cooperatively operate at the DRAM 17. On the other hand, when loading of the sophisticated OS is completed, the boot loader 18 is discharged from the DRAM 17 and does not operate. The boot loader 18 and the sophisticated OS are of different systems. Additionally, the first embodiment describes the sophisticated OS (framework 7) to be Androi-dOS, but this is not restrictive.

Figure 9:
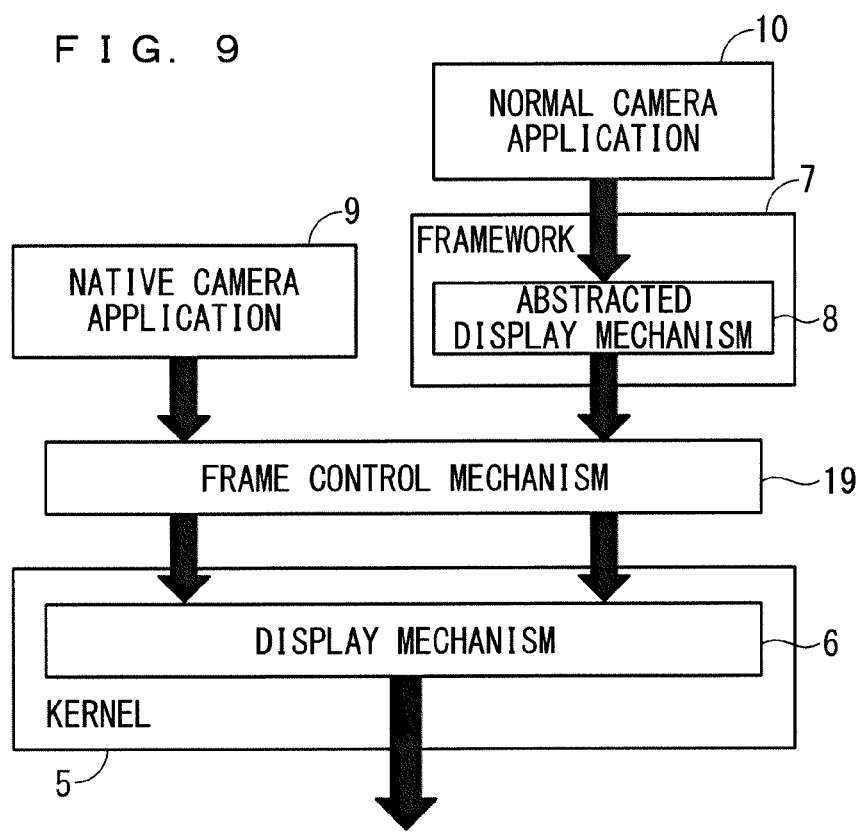
FIG. 9 is a block diagram showing an example of a software configuration of the application execution apparatus according to the first embodiment of the present invention.
Figure 10:
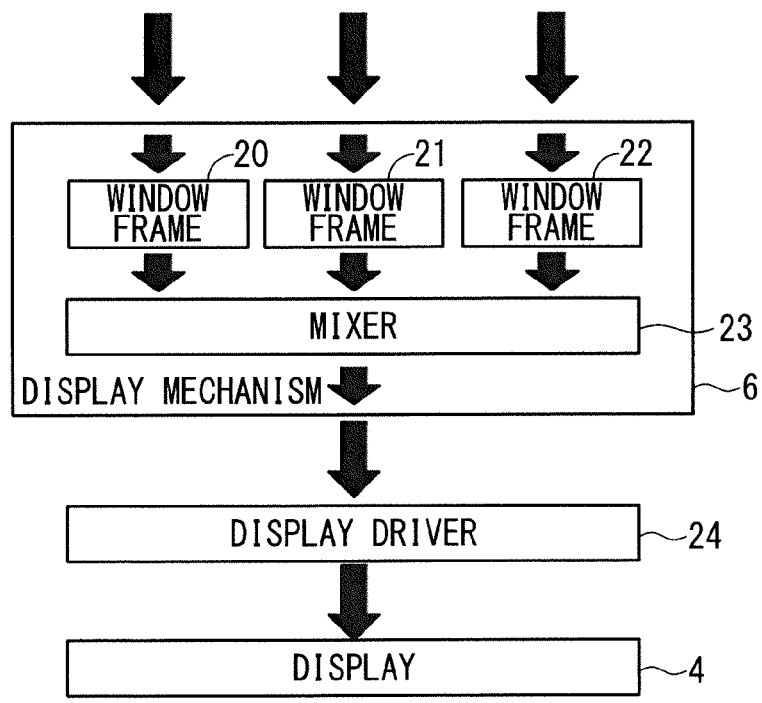
FIG. 10 is a block diagram showing an example of the software configuration of the application execution apparatus according to the first embodiment of the present invention.

FIGS. 9 and 10 are block diagrams showing another example of a software configuration of the application execution apparatus according to the first embodiment. FIG. 9 shows an entire configuration of the application execution apparatus, and FIG. 10 mainly shows a detailed configuration of the kernel 5. Additionally, FIG. 9 shows the configuration in FIG. 2 provided with a frame control mechanism 19, but the frame control mechanism 19 may alternatively be provided to the configuration in FIG. 3.

As shown in FIG. 9, the application execution apparatus includes the frame control mechanism 19. As shown in FIG. 10, the display mechanism 6 includes window frames 20-22, and a mixer 23. Also, the kernel 5 includes a display driver 24.

The frame control mechanism 19 is one of native applications, and is abstracted window frames 20-22. The frame control mechanism 19 performs control of assigning one of the window frames 20-22 to each of a native application and a normal application.

Each of the window frames 20-22 is a region which stores a drawing window and a layer in the drawing window, and which is a screen design configured by a native application and a normal application. Additionally, the first embodiment describes a case where the display mechanism 6 includes three window frames, but it is sufficient if there are a plurality of window frames, without being limited to three.

The mixer 23 includes a function for superimposing a plurality of applications. The display driver 24 includes a function for outputting a camera image to the display 4.

Figure 11:
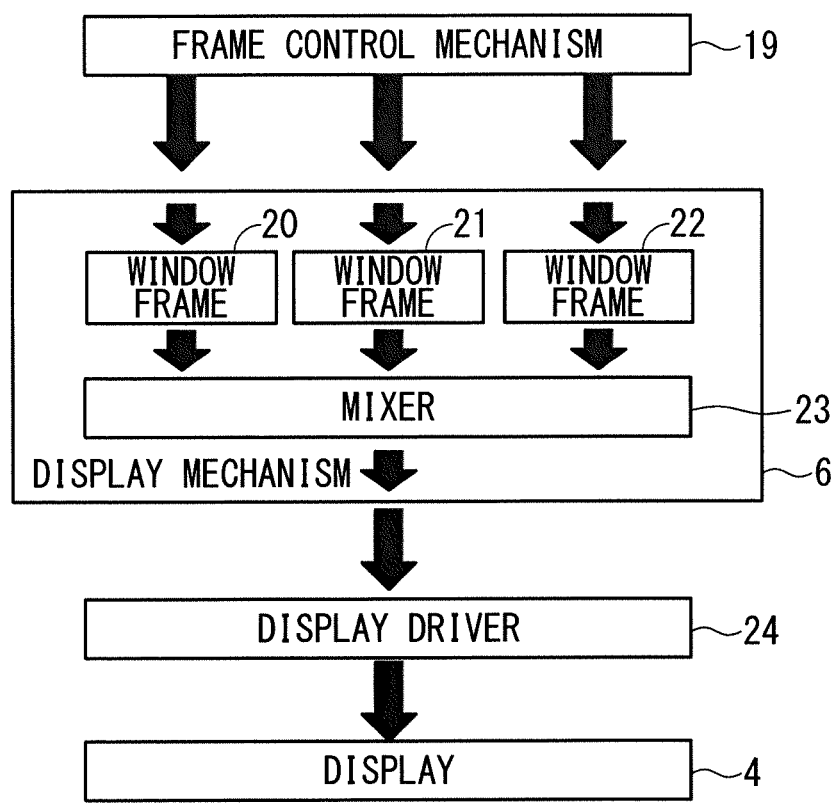
FIG. 11 is a diagram showing a relationship between a frame control mechanism and a display mechanism according to the first embodiment of the present invention.

FIG. 11 is a diagram showing a relationship between the frame control mechanism 19 and the display mechanism 6.

The frame control mechanism 19 manages and controls access by a native application or the abstracted display mechanism 8 of the framework 7 to an arbitrary window frame of the display mechanism 6. That is, the use of a specific window frame can be managed and controlled by the frame control mechanism 19.

Next, operation of the application execution apparatus shown in FIG. 9 will be described with reference to FIGS. 12 to 14.

Figure 12:
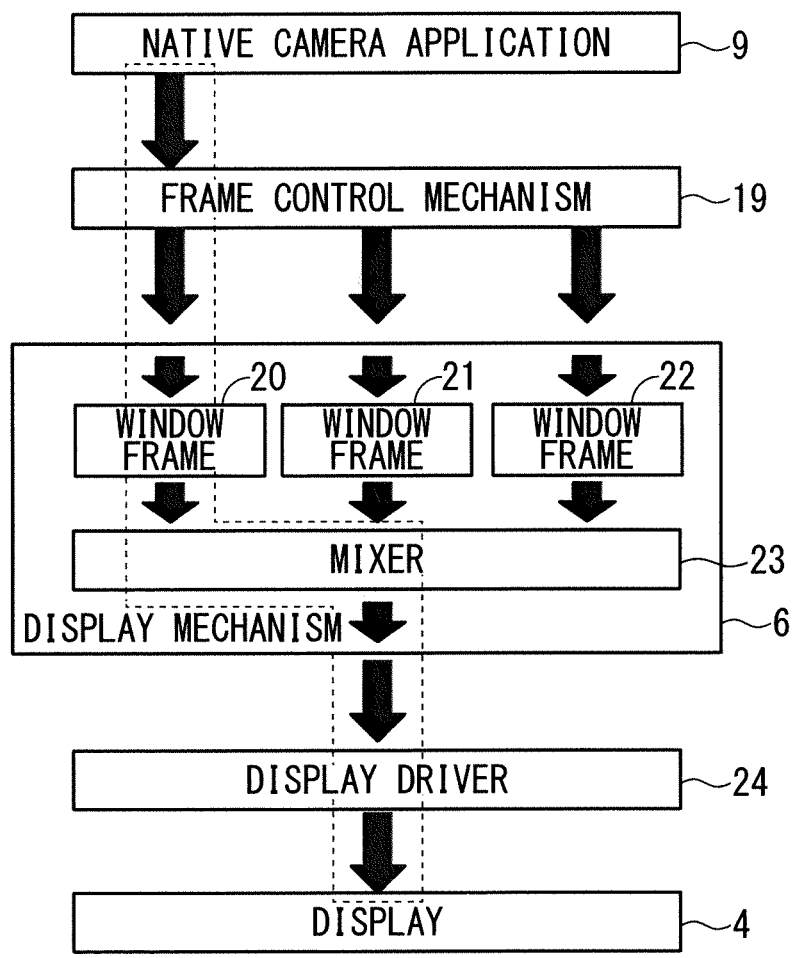
FIG. 12 is a diagram showing an example of operation of the application execution apparatus according to the first embodiment of the present invention.

FIG. 12 shows a case of operation of the native camera application 9. As shown in FIG. 12, the frame control mechanism 19 assigns the window frame 20 of the display mechanism 6 to the native camera application 9. When the native camera application 9 operates, a camera image passes through the window frame 20 and the mixer 23 and is output to the display 4 by driving of the display driver 24 of the kernel 5. At this time, the native camera application 9 does not have to grasp which window frame of the display mechanism 6 is being used.

FIG. 13 shows a case of operation of an arbitrary normal application (other than the normal camera application 10) not including the function for outputting a camera image to the display 4. As shown in FIG. 13, the frame control mechanism 19 assigns the window frame 22 of the display mechanism 6 to the abstracted display mechanism 8 of the framework 7. When a normal application operates, an image drawn by the normal application passes through the window frame 22 and the mixer 23 and is output to the display 4 by driving of the display driver 24 of the kernel 5. At this time, the abstracted display mechanism 8 of the framework 7 does not have to grasp which window frame of the display mechanism 6 is being used.

In the case of simultaneous execution of FIGS. 12 and 13, a camera image by the operation of the native camera application 9 is input to the window frame 20, and an image by the operation of an arbitrary normal application, other than the normal camera application 10, is input to the window frame 22.

The mixer 23 of the display mechanism 6 outputs only the camera image by the operation of the native camera application 9 to the display 4, or outputs only the image by the operation of the arbitrary normal application to the display 4, or performs output to the display 4 after superimposing the camera image by the operation of the native camera application 9 with the image by the operation of the arbitrary normal application. In this manner, a camera image by the operation of the native camera application 9 and an image by the operation of an arbitrary normal application may be output by being switched from each other or by being superimposed with each other.

Figure 14:
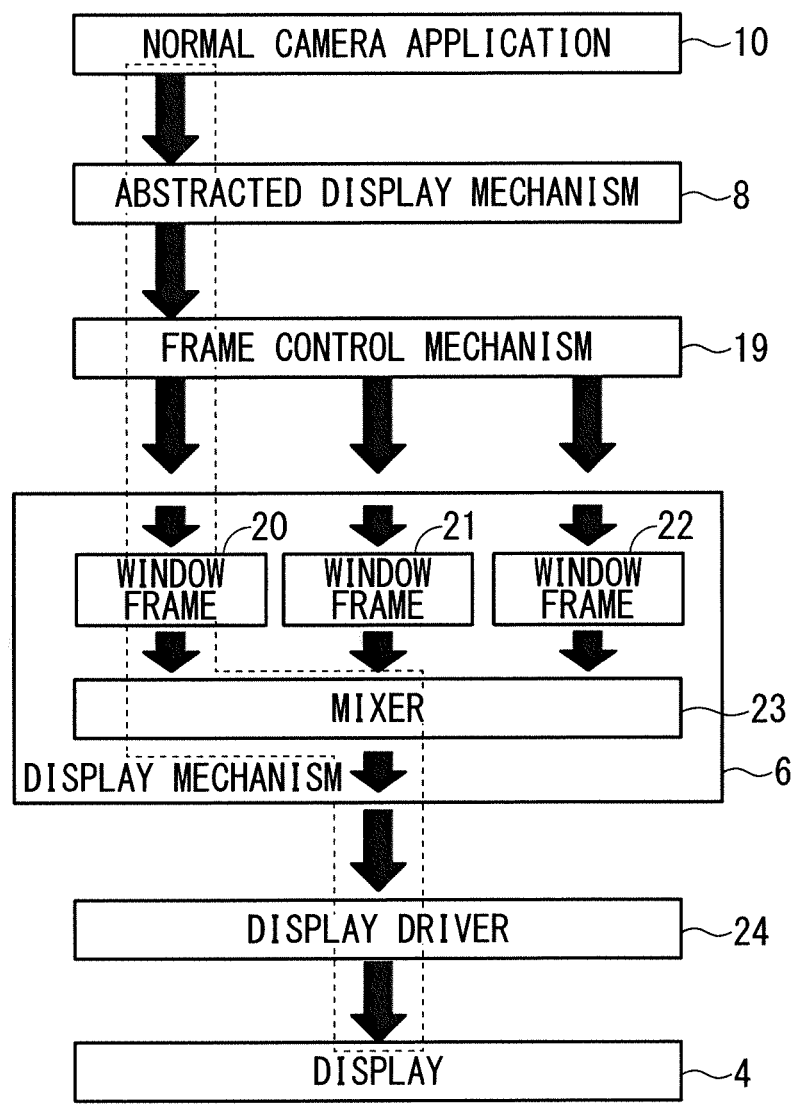
FIG. 14 is a diagram showing an example of the operation of the application execution apparatus according to the first embodiment of the present invention.

FIG. 14 shows a case of operation of the normal camera application 10. As shown in FIG. 14, the frame control mechanism 19 assigns the window frame 20 of the display mechanism 6 to the normal camera application 10 through the abstracted display mechanism 8 of the framework 7. When the normal camera application 10 operates, a camera image passes through the window frame 20 and the mixer 23, and is output to the display 4 by driving of the display driver 24 of the kernel 5.

As described above, the frame control mechanism 19 controls the window frames according to hardware resources, with no respect to the native camera application 9 and the normal camera application 10 at upper levels of the frame control mechanism 19. In the examples in FIGS. 12 and 14, the camera image, which is the hardware resource, is common between the native camera application 9 and the normal camera application 10, and thus, the same window frame 20 is assigned.

Also, at the time of switching from the native camera application 9 to the normal camera application 10 (at the time of camera image handover), output of the camera image is continued by using the window frame 20 under the control of the frame control mechanism 19, and thus, flicker in the display image (disturbance in the camera image) at the time of switching is not caused.

Figure 15:
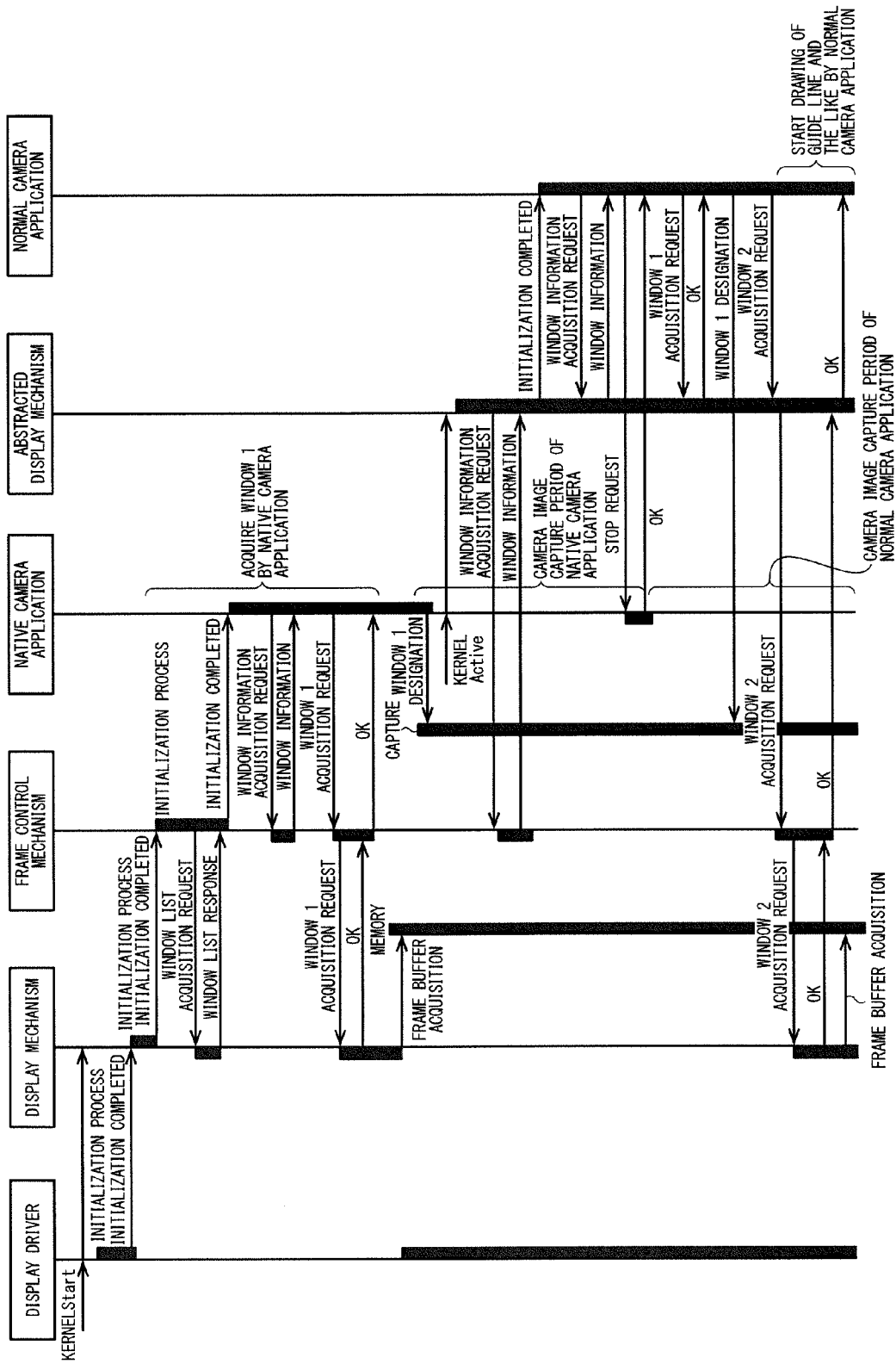
FIG. 15 is a diagram showing an example of the operation of the application execution apparatus according to the first embodiment of the present invention.

FIG. 15 is a sequence diagram collectively showing operations shown in FIGS. 12 and 14.

As shown in FIG. 15, when the kernel 5 is started, the display driver 24, the display mechanism 6, and the frame control mechanism 19 perform initialization processes. The frame control mechanism 19 acquires a window list from the display mechanism 6 during the initialization process.

When the initialization process of the frame control mechanism 19 is completed, the native camera application 9 acquires window information from the frame control mechanism 19, and then, obtains a window 1. At this time, the display mechanism 6 obtains a frame buffer from a memory. A camera image is thus captured by the operation of the native camera application 9. Additionally, in the example in FIG. 12, the window 1 corresponds to the window frame 20. Also, the memory corresponds to the DRAM 17 in FIG. 4, for example. Moreover, the camera image is captured by the capture 2 in FIG. 1, for example.

When the kernel 5 is placed in an operation state, the abstracted display mechanism 8 acquires the window information from the frame control mechanism 19 during the initialization process. When the initialization process of the abstracted display mechanism 8 is completed, the normal camera application 10 acquires the window information from the abstracted display mechanism 8, and then, issues a stop request to the native camera application 9. Then, the normal camera application 10 obtains the window 1 from the abstracted display mechanism 8.

The normal camera application 10 obtains a window 2 from the display mechanism 6, and performs drawing of a guide line or the like by using the window 2. Additionally, the window 2 may be the window frame 22 (see FIG. 13), for example.

Switching from the native camera application 9 to the normal camera application 10 is performed in the above manner (that is, camera image handover is performed). At this time, because the native camera application 9 and the normal camera application 10 use the common window 1, flicker is not caused in the camera image.

Figure 16:
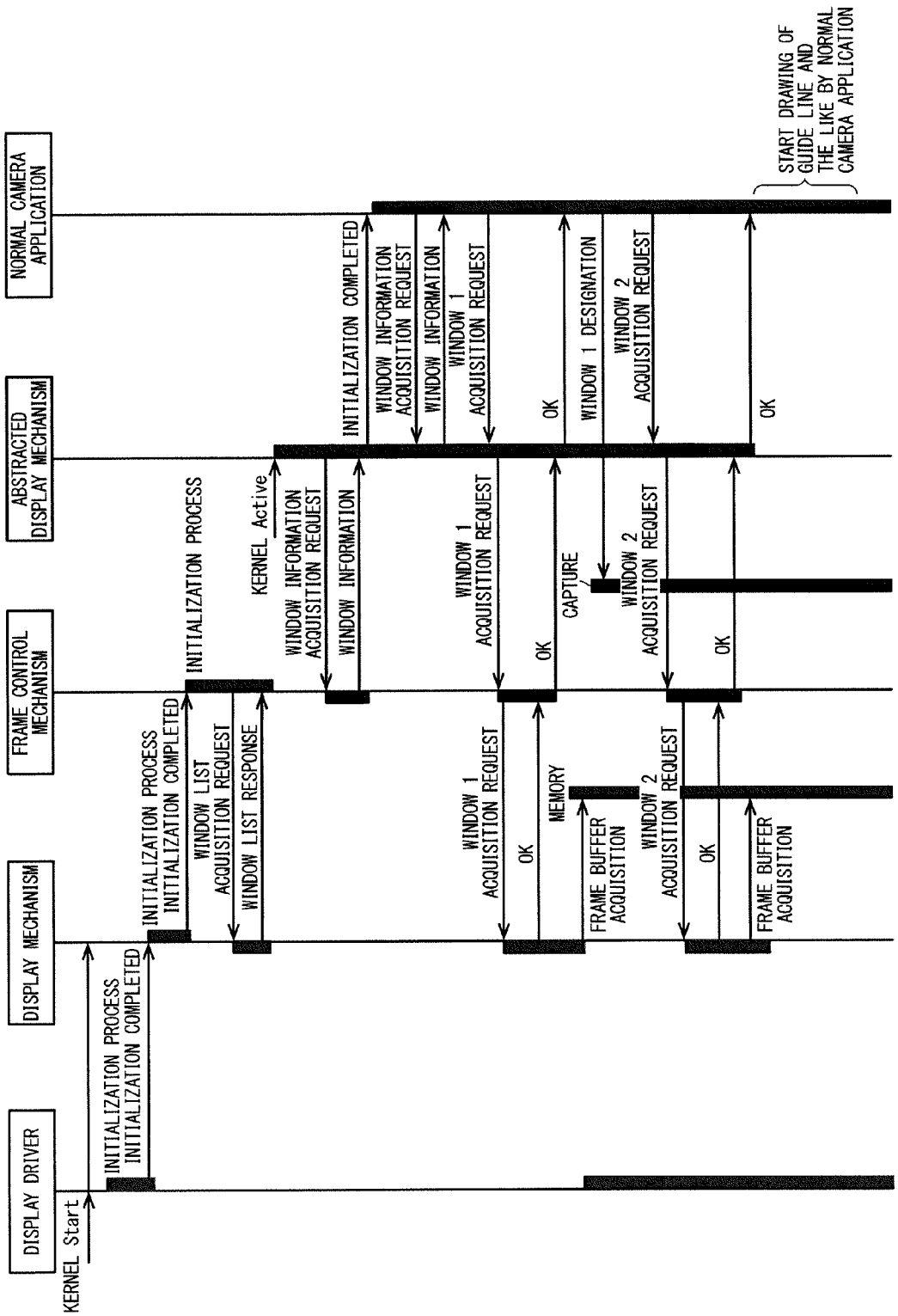
FIG. 16 is a diagram showing an example of a case where only a conventional normal camera application is operated.

FIG. 16 is a diagram showing an example of a case where only a conventional normal camera application is operated. As shown in FIG. 16, the normal camera application does not perform camera image handover by using a common window with the native camera application as shown in FIG. 15. Accordingly, flicker is conventionally caused at the time of handover to a camera image by the operation of the normal camera application.

As described above, according to the first embodiment, occurrence of flicker in a display image may be prevented at the time of camera image handover by assigning the same window frame to the native camera application 9 and the normal camera application 10.

Second Embodiment

A second embodiment of the present invention is for minimizing the function of the native application. Other configurations and operations are the same as those in the first embodiment, and detailed description thereof is omitted.

Figure 17:
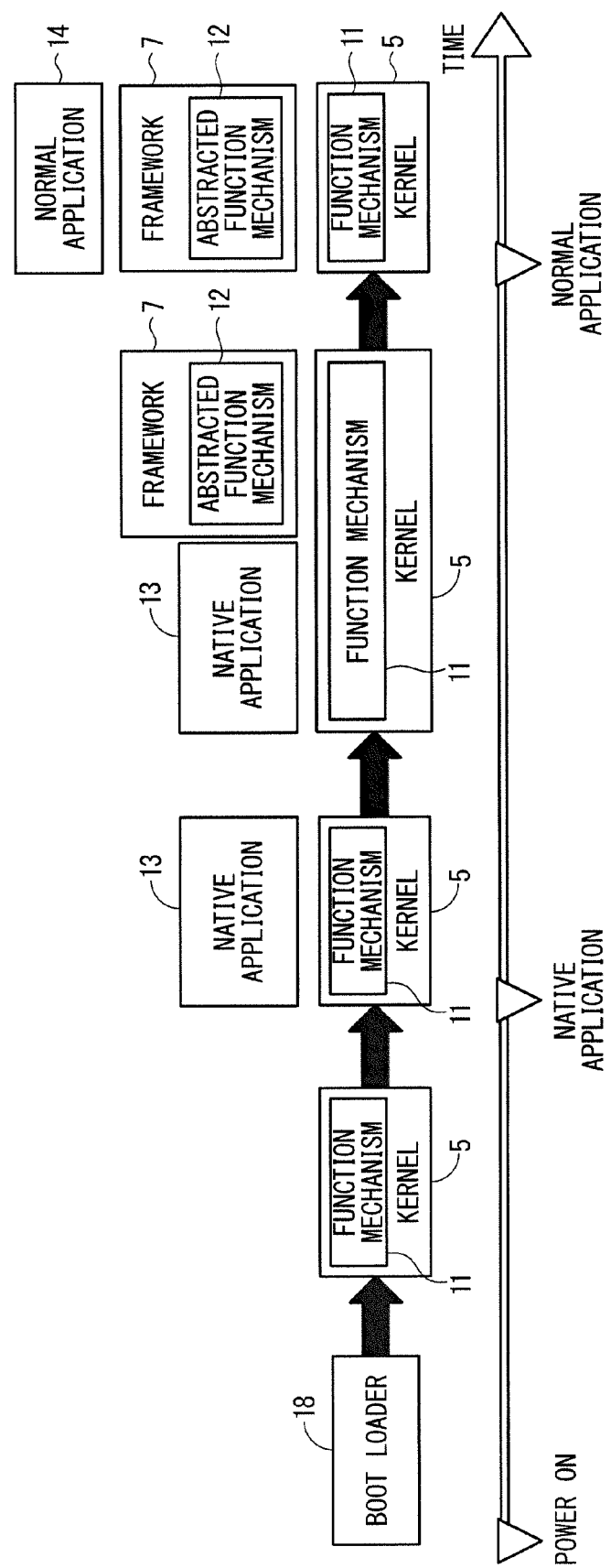
FIG. 17 is a diagram showing an example of operation of an application execution apparatus according to a second embodiment of the present invention.

FIG. 17 is a diagram showing an example of the operation of the application execution apparatus, where the CPU 3 includes each function shown in FIG. 3.

As shown in FIG. 17, after the power of the CPU 3 is turned on, the boot loader 18 loads the kernel 5 into the DRAM 17. The kernel 5 starts at the DRAM 17 (see FIGS. 6, 7).

The CPU 3 loads the native application 13 into the DRAM 17, and starts the native application 13. The native application 13 performs a predetermined function by directly using the function mechanism 11 of the kernel 5.

After the native application 13 is started, the kernel 5 loads the framework 7 into the DRAM 17. The framework 7 starts at the DRAM 17 (see FIG. 8).

After the framework 7 is started, the CPU 3 loads the normal application 14 into the DRAM 17, and starts the normal application 14. The normal application 14 performs a predetermined function by indirectly using the function mechanism 11 of the kernel 5 through the abstracted function mechanism 12 of the framework 7.

In the above description, the native application 13 is loaded into the DRAM 17 and is developed, and thus, the loading time is dependent on the volume of the native application 13. To start the native application 13 in a short time after turning on of the CPU 3, the function of the native application 13 has to be minimized and the program volume of the native application 13 has to be suppressed (that is, the volume of the native camera application 9 has to be made smaller than that of the normal camera application 10). This optimizes the loading time of the native application 13, and the time from turning on of the CPU 3 to operation of the native application 13 is reduced.

Additionally, operation of the native application 13 is ended at an arbitrary timing after execution of the normal application 14. The arbitrary timing may be the time of start of operation of the normal application 14, or the time when the normal application 14 has completely operated (after operation of the normal application 14), for example.

Figure 18:
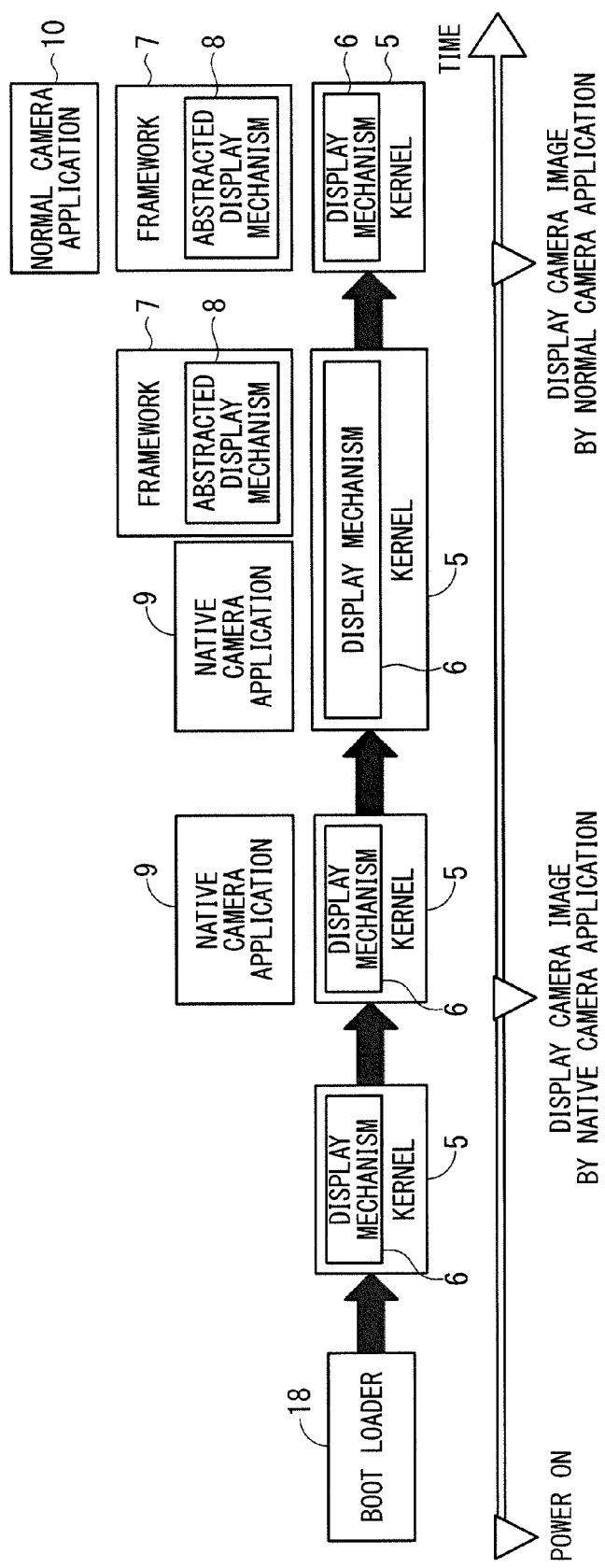
FIG. 18 is a diagram showing an example of the operation of the application execution apparatus according to the second embodiment of the present invention.

FIG. 18 is a diagram showing an example of the operation of the application execution apparatus, where the CPU 3 includes each function shown in FIG. 2.

As shown in FIG. 18, after the power of the CPU 3 is turned on, the boot loader 18 loads the kernel 5 into the DRAM 17. The kernel 5 starts at the DRAM 17 (see FIGS. 6, 7).

The CPU 3 loads the native camera application 9 into the DRAM 17, and starts the native camera application 9. The native camera application 9 outputs a camera image to the display 4 by using the display mechanism 6 of the kernel 5.

After the native camera application 9 is started, the kernel 5 loads the framework 7 into the DRAM 17. The framework 7 starts at the DRAM 17 (see FIG. 8).

After the framework 7 is started, the CPU 3 loads the normal camera application 10 into the DRAM 17, and starts the normal camera application 10. The normal camera application 10 displays, on the display 4, a camera image on which additional information such as a guide line is superimposed, by indirectly using the display mechanism 6 of the kernel 5 through the abstracted display mechanism 8 of the framework 7.

In the above description, the native camera application 9 is loaded into the DRAM 17 and is developed, and thus, the loading time is dependent on the volume of the native camera application 9. To start the native camera application 9 in a short time after turning on of the CPU 3, the function of the native camera application 9 has to be minimized and the program volume of the native camera application 9 has to be suppressed (that is, the volume of the native camera application 9 has to be made smaller than that of the normal camera application 10). This optimizes the loading time of the native camera application 9, and the time from turning on of the CPU 3 to operation of the native camera application 9 is reduced.

Also, the native camera application 9 and the normal camera application 10 operate by directly or indirectly using the same display mechanism 6. Accordingly, flicker in a display screen is not caused at the time of switching from a camera image by the native camera application 9 to a camera image by the normal camera application 10.

Additionally, operation of the native camera application 9 is ended at an arbitrary timing after execution of the normal camera application 10. The arbitrary timing may be the time of start of operation of the normal camera application 10, or the time when the normal camera application 10 has completely operated (after operation of the normal camera application 10), for example.

As described above, according to the second embodiment, quick startup at cold boot may be realized by minimizing the function of the native application 13 (or of the native camera application 9).

Additionally, description is given above with respect to the configurations shown in FIGS. 2 and 3, but application to the configuration shown in FIG. 9 is also possible.

Third Embodiment

According to the second embodiment, the entire function mechanism 11 in the kernel 5 has to be started to cause the entire abstracted function mechanism 12 in the framework 7 to operate. Accordingly, the kernel 5 has to initialize and develop all the drivers, all the hardware resources, and all the function mechanisms, and initialization/development by the kernel takes time (see FIG. 17).

According to a third embodiment of the present invention, function mechanisms and the like necessary for operation of the native application are started in advance. Other configurations and operations are the same as those in the second embodiment, and detailed description thereof is omitted.

Figure 19:
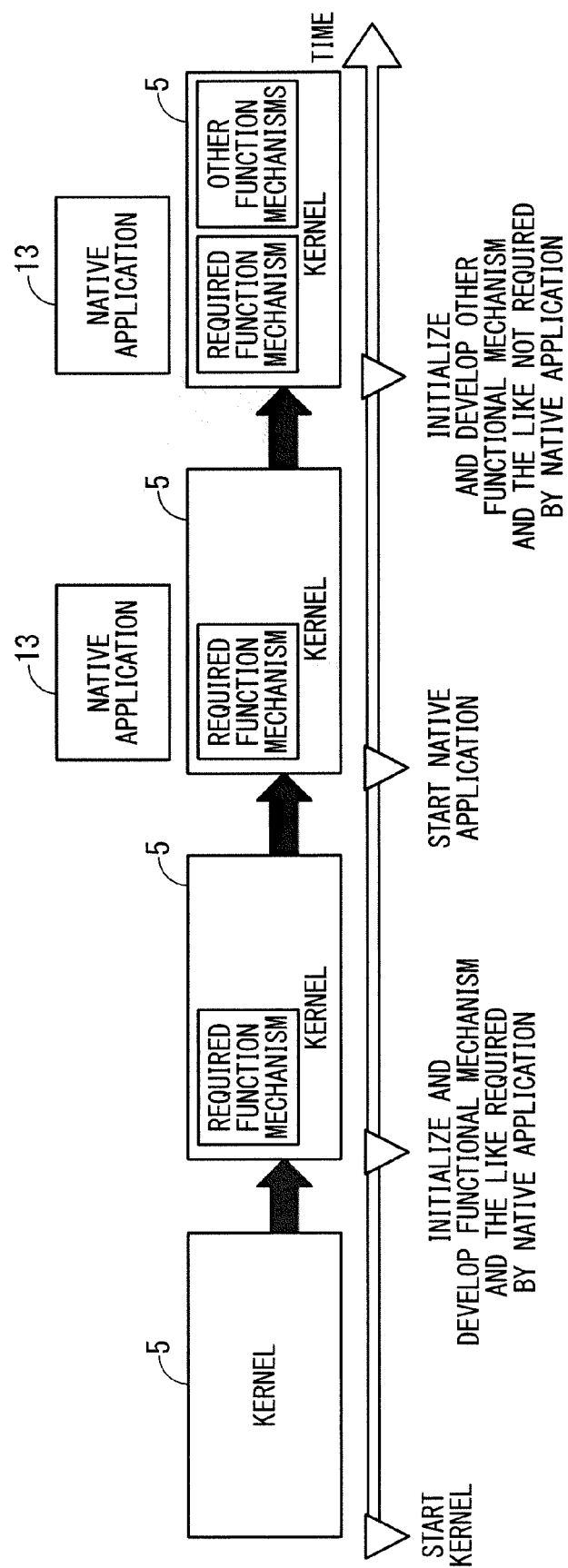
FIG. 19 is a diagram showing an example of operation of an application execution apparatus according to a third embodiment of the present invention.

FIG. 19 is a diagram showing an example of the operation of the application execution apparatus, where the CPU 3 includes each function shown in FIG. 3.

As shown in FIG. 19, after the power of the CPU 3 is turned on, the boot loader 18 loads the kernel 5 into the DRAM 17. The kernel 5 starts at the DRAM 17 (see FIGS. 6, 7). At this time, the kernel 5 initializes and develops a driver, a hardware resource, and a function mechanism required by the native application 13, among the function mechanism 11.

The CPU 3 loads the native application 13 into the DRAM 17, and starts the native application 13. The native application 13 performs a predetermined function by directly using a function mechanism required by the native application 13, among the function mechanism 11 of the kernel 5.

After the native application 13 is executed, the kernel 5 initializes and develops a driver, a hardware resource, and a function mechanism not required by the native application 13, among the function mechanism 11.

The following operation (such as startup of the normal application 14) is the same as that of the second embodiment (see FIG. 17), and description thereof is omitted.

The time from turning on of the CPU 3 to operation of the native application 13 may thus be reduced.

Figure 20:
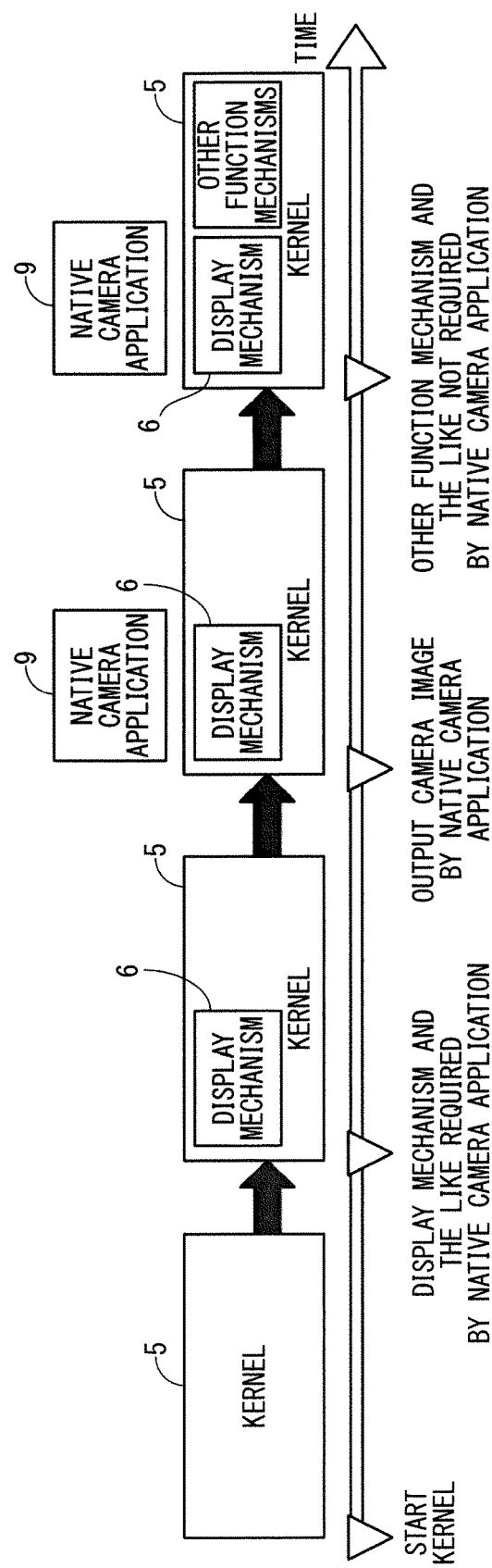
FIG. 20 is a diagram showing an example of the operation of the application execution apparatus according to the third embodiment of the present invention.

FIG. 20 is a diagram showing an example of the operation of the application execution apparatus, where the CPU 3 includes each function shown in FIG. 2.

As shown in FIG. 20, after the power of the CPU 3 is turned on, the boot loader 18 loads the kernel 5 into the DRAM 17. The kernel 5 starts at the DRAM 17 (see FIGS. 6, 7). At this time, the kernel 5 initializes and develops a driver, a hardware resource, and the display mechanism 6 required by the native camera application 9, among the function mechanism 11.

The CPU 3 loads the native camera application 9 into the DRAM 17, and starts the native camera application 9. The native camera application 9 outputs a camera image to the display 4 by directly using the display mechanism 6 of the kernel 5.

After the native camera application 9 is executed, the kernel 5 initializes and develops a driver, a hardware resource, and a function mechanism (function mechanism other than the display mechanism 6) not required by the native camera application 9, among the function mechanism 11.

The following operation (such as startup of the normal camera application 10) is the same as that of the first embodiment (see FIG. 18), and description thereof is omitted.

The time from turning on of the CPU 3 to operation of the native camera application 9 may thus be reduced.

As described above, according to the third embodiment, quick startup at cold boot may be realized by starting a function mechanism required by the native application 13 (or the native camera application 9) in advance, and then executing the native application 13 (or the native camera application 9).

Additionally, as in the second embodiment, the volume of the native application 13 (or the native camera application 9) may be smaller than that of the normal application 14 (or the normal camera application 10).

Additionally, the embodiments may be freely combined, or an embodiment may be modified or omitted as appropriate within the scope of the present invention.

Although the present invention is described above in detail, the description given above is only exemplary in every aspect, and the present invention is not limited thereto. It is to be understood that an indefinite number of example modifications not illustrated are conceivable within the scope of the present invention.

REFERENCE SIGNS LIST

1: camera
2: capture
3: CPU
4: display
5: kernel
6: display mechanism
7: framework
8: abstracted display mechanism
9: native camera application
10: normal camera application
11: function mechanism
12 abstracted function mechanism
13: native application
14: normal application
15: NOR flash memory
16: eMMC
17: DRAM
18: boot loader
19: frame control mechanism
20, 21, 22: window frame
23: mixer
24: display driver
25: camera
26: capture
27: graphic
28: CPU
29: switch
30: display
31: OS
32: display mechanism
33: application
34: OS
35: display mechanism
36: application

The invention claimed is:

1. An application execution apparatus comprising:
a processor to execute programs; and
a memory to store said programs executed by the processor, said programs including a kernel and a framework which are sequentially started by said processor, wherein
said kernel includes a display mechanism, and
said framework is started by said kernel, and includes an abstracted display mechanism obtained by abstracting said display mechanism,
wherein said programs stored by said memory further include,
a frame control mechanism that controls a plurality of window frames included in said display mechanism;
a first application, which is executed by said processor after the kernel is started and before the framework is started, said first application operating by directly using said display mechanism; and
a second application, which is executed by said processor after the framework is started, said second application operating by indirectly using said display mechanism through said abstracted display mechanism, and that includes a common function of said first application,
wherein said frame control mechanism performs control such that a same one of said plurality of window frames is assigned at a time of operation of each of said first application and said second application, and
wherein, as a result of said common function, said first application and said second application are operative to output a same base image to said same window frame.

2. The application execution apparatus according to claim 1, wherein a volume of said first application is smaller than a volume of said second application.

3. The application execution apparatus according to claim 1, wherein said kernel includes a plurality of function mechanisms including said display mechanism, and starts only said display mechanism that is required for operation of said first application and then starts another said function mechanism that is not required for operation of said first application.

4. The application execution apparatus according to claim 1, wherein operation of said first application is ended after execution of said second application.

5. The application execution apparatus according to claim 1, wherein said kernel is a LINUX (registered trademark) kernel.

6. The application execution apparatus according to claim 1, wherein said framework is ANDROID (registered trademark) operating system.

7. The application execution apparatus according to claim 1, wherein said display mechanism comprises the "SurfaceFlinger" system service and the "Hardware Composer" hardware abstraction layer of ANDROID (registered trademark) operating system.

8. An application execution apparatus according to claim 1, wherein said second application includes an additional function of superimposing a graphic on said base image.

9. An application execution method comprising:
sequentially starting at least a kernel and a framework;
executing a first application after the kernel is started and before the framework is started; and
executing a second application after the framework is started,
wherein said kernel includes a display mechanism,
wherein a frame control mechanism controls a plurality of window frames included in said display mechanism;
wherein said framework is started by said kernel, and includes an abstracted display mechanism obtained by abstracting said display mechanism,
wherein said first application operates by directly using said display mechanism,
wherein said second application operates by indirectly using said display mechanism through said abstracted display mechanism, and includes a common function of said first application,
wherein said frame control mechanism performs control such that a same one of said plurality of window frames is assigned at a time of operation of each of said first application and said second application, and
wherein, as a result of said common function, said first application and said second application are operative to output a same base image to said same window frame.

10. The application execution method according to claim 9, wherein said second application includes an additional function of superimposing a graphic on said base image.

\* \* \* \* \*